United States Patent
Prather et al.

(10) Patent No.: US 9,777,632 B2
(45) Date of Patent: Oct. 3, 2017

(54) ANTI-ICE SPLITTER NOSE

(71) Applicant: General Electric Company, Schenectady, NY (US)

(72) Inventors: Randall Maurice Prather, Cincinnati, OH (US); Neil Fraser Cunningham, Madeira, OH (US); Junhaur Jih, Cincinnati, OH (US); Erich Alois Krammer, West Chester, OH (US); Sesha Subramanian, Bangalore (IN)

(73) Assignee: General Electric Company, Schenectady, NY (US)

( * ) Notice: Subject to any disclaimer, the term of this patent is extended or adjusted under 35 U.S.C. 154(b) by 189 days.

(21) Appl. No.: 14/889,752

(22) PCT Filed: May 7, 2013

(86) PCT No.: PCT/US2013/039903
§ 371 (c)(1),
(2) Date: Nov. 6, 2015

(87) PCT Pub. No.: WO2014/182289
PCT Pub. Date: Nov. 13, 2014

(65) Prior Publication Data
US 2016/0097323 A1    Apr. 7, 2016

(51) Int. Cl.
*F01D 25/02* (2006.01)
*F02C 7/047* (2006.01)

(52) U.S. Cl.
CPC .............. *F02C 7/047* (2013.01); *F01D 25/02* (2013.01); *F05D 2260/201* (2013.01); *Y02T 50/672* (2013.01); *Y02T 50/675* (2013.01)

(58) Field of Classification Search
CPC .............. F01D 25/02; F05D 2260/201; F05B 2260/201; F02C 7/047; F02C 6/08; F02C 9/18; B64D 15/02; B64D 15/04
(Continued)

(56) References Cited

U.S. PATENT DOCUMENTS

| 4,738,416 A | 4/1988 | Birbragher |
| 4,863,354 A | 9/1989 | Asselin et al. |

(Continued)

FOREIGN PATENT DOCUMENTS

| CN | 101918275 A | 12/2010 |
| EP | 2505789 A1 | 10/2012 |

(Continued)

OTHER PUBLICATIONS

Unofficial English Translation of Chinese Office Action issued in connection with corresponding CN Application No. 01380076426.9 on Jul. 4, 2016.

(Continued)

*Primary Examiner* — Christopher Verdier
(74) *Attorney, Agent, or Firm* — General Electric Company; William Scott Andes

(57) ABSTRACT

Splitter apparatus for gas turbine engines are disclosed. An example splitter apparatus may include a splitter including an annular outer wall substantially defining a convex leading edge; an annular splitter support positioned radially within the outer and including a forward end disposed substantially against a splitter inner; and an annular first bulkhead spanning between the outer wall and the splitter support. The outer wall, the splitter support, and the first bulkhead may define a generally annular splitter plenum. The forward end of the splitter support may include spaced apart, radially oriented metering slots. The outer wall may include an inner portion disposed radially inward from the splitter inner surface extending aft and including spaced-apart exit slots. The splitter plenum, the metering slots, and the exit slots may conduct airflow from the plenum, through the metering slots against the splitter inner surface, and through the exit slots.

20 Claims, 5 Drawing Sheets

(58) Field of Classification Search
USPC .............................. 415/144, 145, 176–178
See application file for complete search history.

(56) References Cited

U.S. PATENT DOCUMENTS

| | | | |
|---|---|---|---|
| 5,088,277 | A | 2/1992 | Schulze |
| 6,561,760 | B2 | 5/2003 | Wadia et al. |
| 8,899,917 | B2 | 12/2014 | Bajusz et al. |
| 2009/0165995 | A1 | 7/2009 | Bajusz et al. |
| 2010/0252685 | A1 | 10/2010 | Porte et al. |
| 2012/0189432 | A1* | 7/2012 | Jordan .................. F01D 5/022 |
| | | | 415/144 |
| 2012/0192544 | A1 | 8/2012 | Roby et al. |

FOREIGN PATENT DOCUMENTS

| | | |
|---|---|---|
| JP | H01-125524 A | 5/1989 |
| JP | H02-130225 A | 5/1990 |

OTHER PUBLICATIONS

Search Report issued in connection with corresponding JP Application No. 2016-512887 dated Feb. 24, 2017.
Notification of Reasons for Refusal issued in connection with corresponding JP Application No. 2016-512887 dated Mar. 7, 2017.
PCT Search Report and Written Opinion issued in connection with corresponding Application No. PCT/US2013/039903 dated Mar. 10, 2014.

\* cited by examiner

ANTI-ICE SPLITTER NOSE

CROSS-REFERENCE TO RELATED APPLICATION

This is a national stage application under 35 U.S.C. §371(c) of prior filed, co-pending PCT application serial number PCT/US2013/039903, filed on May 7, 2014, and titled ANTI-ICE SPLITTER NOSE. The above-listed application is herein incorporated by reference.

BACKGROUND

The subject matter disclosed herein relates generally to turbine engine structures and, more particularly, to materials and designs for improving anti-icing characteristics of such structures.

One common type of aircraft powerplant is a turbofan engine, which includes a turbomachinery core having a high pressure compressor, combustor, and high pressure turbine in serial flow relationship. The core is operable in a known manner to generate a flow of propulsive gas. A low pressure turbine driven by the core exhaust gases drives a fan through a shaft to generate a propulsive bypass flow. The low pressure turbine also drives a low pressure compressor or "booster," which supercharges the inlet flow to the high pressure compressor.

Certain flight conditions may allow for ice buildup on some leading edges of various engine structures, such as the fan and booster flowpath areas of the engine. One specific leading edge structure of interest may be the engine's booster splitter. The splitter may include a generally annular ring with a leading edge that is positioned aft of the fan blades. It functions to separate the airflow for combustion (via the booster) from the bypass airflow.

Generally, it may be desirable to reduce and/or prevent ice buildup and shed volume from the splitter during icing conditions. This in turn may reduce the risk of compressor stall and compressor mechanical damage due to ingested ice. Some booster splitters may be heated using relatively warm compressor bleed air, which may reduce ice buildup on the splitter nose.

The problem: Anti-ice heating of the booster splitter nose using compressor bleed air may involve competing requirements for booster splitter strength and heat transfer capacity to the booster splitter nose. Further, excessive booster splitter weight and/or consumption of compressor bleed air may adversely affect the engine's efficiency in terms of specific fuel consumption (SFC).

BRIEF DESCRIPTION OF THE INVENTION

At least one solution for the above-mentioned problem(s) is provided by the present disclosure to include example embodiments, provided for illustrative teaching and not meant to be limiting.

An example splitter apparatus for a gas turbine engine according to at least some aspects of the present disclosure may include a splitter including a generally annular outer wall substantially defining a convex leading edge at a forward end thereof; a generally annular splitter support positioned radially within the outer wall, the splitter support including a forward end disposed substantially against a splitter inner surface of the outer wall; and a generally annular first bulkhead spanning between the outer wall and the splitter support. The outer wall, the splitter support, and the first bulkhead may collectively substantially define a generally annular splitter plenum. The forward end of the splitter support may include a plurality of circumferentially spaced apart, generally radially oriented metering slots therein. The outer wall may include an inner portion disposed generally radially inward from the splitter inner surface and extending generally aft, the inner portion comprising a plurality of spaced-apart exit slots. The splitter plenum, the metering slots, and the exit slots may be arranged to conduct airflow from the plenum, through the metering slots substantially against the splitter inner surface, and through the exit slots.

An example gas turbine engine according to at least some aspects of the present disclosure may include a rotatable fan; a rotatable booster disposed aft of the fan; a turbomachinery core disposed aft of the booster and operable to generate a flow of pressurized combustion gases; a generally annular core nacelle disposed radially around the booster and the turbomachinery core; a low-pressure turbine disposed aft of the turbomachinery core and mechanically coupled to the booster and the fan; a radial array of airfoils disposed forward of the booster and substantially circumscribed by a generally annular outer band; a splitter disposed at a forward end of the core nacelle and surrounding the outer band. The splitter may include a generally annular outer wall substantially defining a convex-curved leading edge at a forward end thereof; a generally annular splitter support positioned radially within the outer wall, the splitter support including a forward end disposed in contact with a splitter inner surface of the outer wall; and a generally annular first bulkhead spanning between the outer wall and the splitter support. The outer wall, the splitter support, and the first bulkhead may substantially define a generally annular splitter plenum. The forward end of the splitter support may include a plurality of circumferentially spaced apart, generally radially oriented metering slots therein. The outer wall may include an inner portion disposed generally radially inward from the splitter inner surface and extending generally aft, the inner portion comprising a plurality of spaced-apart exit slots. The splitter plenum, the metering slots, and the exit slots may be arranged to conduct airflow from the plenum, through the metering slots substantially against the splitter inner surface, and through the exit slots.

BRIEF DESCRIPTION OF THE DRAWINGS

The subject matter for which patent claim coverage is sought is particularly pointed out and claimed herein. The subject matter and embodiments thereof, however, may be best understood by reference to the following description taken in conjunction with the accompanying drawing figures in which:

DETAILED DESCRIPTION

Figure 1:
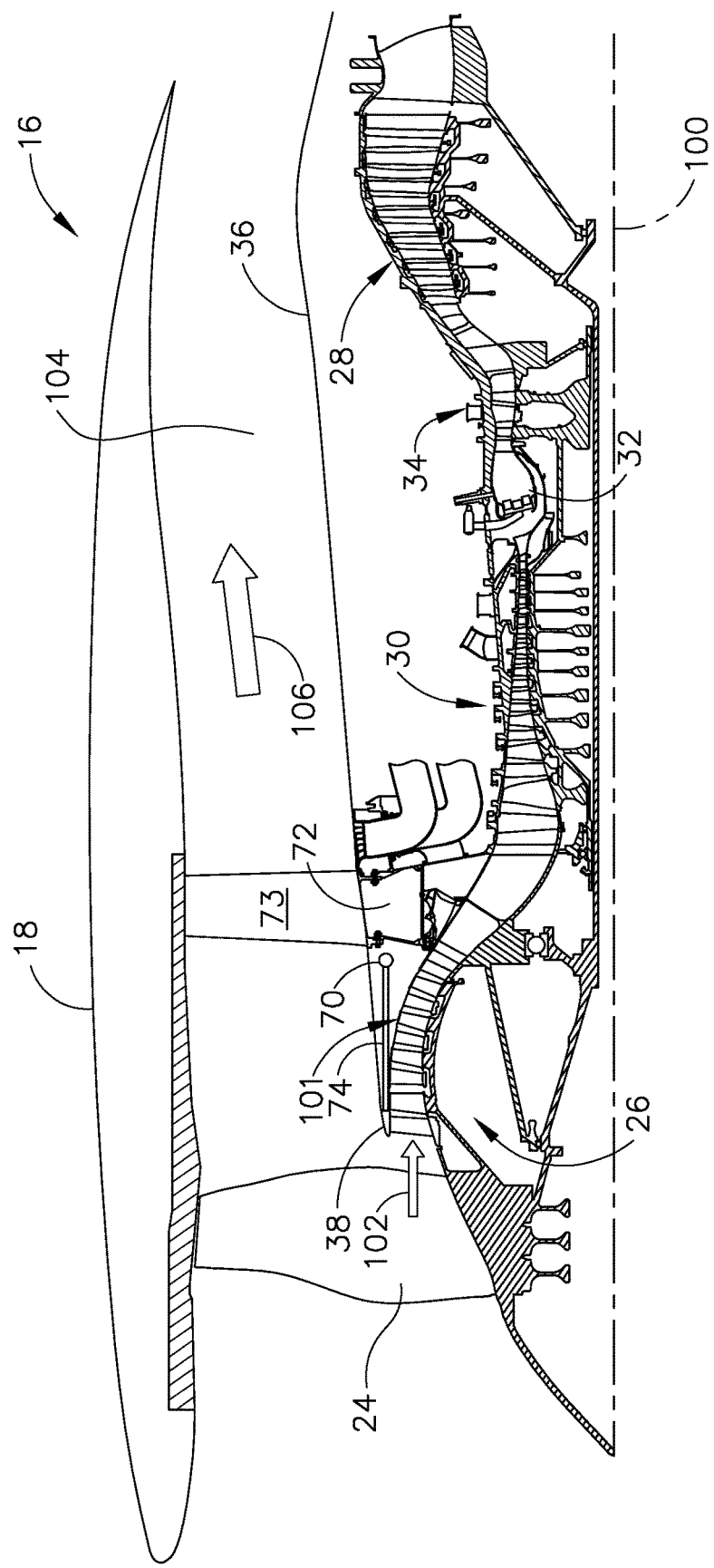
FIG. 1 is a schematic half cross-sectional view of a gas turbine engine incorporating an example heated booster splitter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure includes, inter alia, turbine engine structures and, more particularly, materials and designs for improving anti-icing characteristics of such structures. Generally, some example embodiments according to at least some aspects of the present disclosure may be configured to reduce ice accumulation on booster splitters of turbofan engines.

The present disclosure contemplates that some booster splitters may be heated using compressor bleed air, which may reduce ice buildup on the splitter nose. See U.S. Pat. No. 6,561,760 and U.S. Patent Application Publication No. 2012/0192544, which are incorporated by reference herein in their entirety.

FIG. 1 is a schematic half cross-sectional view of a gas turbine engine 16 incorporating an example heated booster splitter 38, according to at least some aspects of the present disclosure. The engine 16 has a longitudinal axis 100 and includes a fan 24, a low pressure compressor or "booster" 26 and a low pressure turbine ("LPT") 28, collectively referred to as a "low pressure system," and a high pressure compressor ("HPC") 30, a combustor 32, and a high pressure turbine ("HPT") 34, collectively referred to as a "gas generator" or "core." Various components of the nacelle 18 and stationary structures of the engine 16, including a core nacelle 36, cooperate to define a core flowpath 101 for core airflow 102 and a bypass duct 104 for bypass flow 106.

A stationary booster splitter 38 (or simply "splitter"), which may be generally annular, may be positioned at the forward end of the core nacelle 36, between the bypass duct 104 and the core flowpath 101. The splitter 38 may be a single continuous ring or it may be built up from a plurality of generally arcuate segments. A variety of suitable materials such as metal alloys (titanium alloy) and/or composites may be used to construct splitter 38.

A generally annular manifold 70 may be positioned outside the booster 26, such as forward of an annular fan hub frame 72. Struts and/or fan OGVs 73 may extend generally radially outward from the fan hub frame 72 to join the nacelle 18. A generally annular array of feed pipes 74 (which may be thermally insulated) may extend substantially axially forward from the manifold 70 to the splitter 38. As described below, manifold 70 and/or feed pipes 74 may be arranged to supply generally warmer air to splitter 38 to reduce ice buildup thereon.

Figure 2:
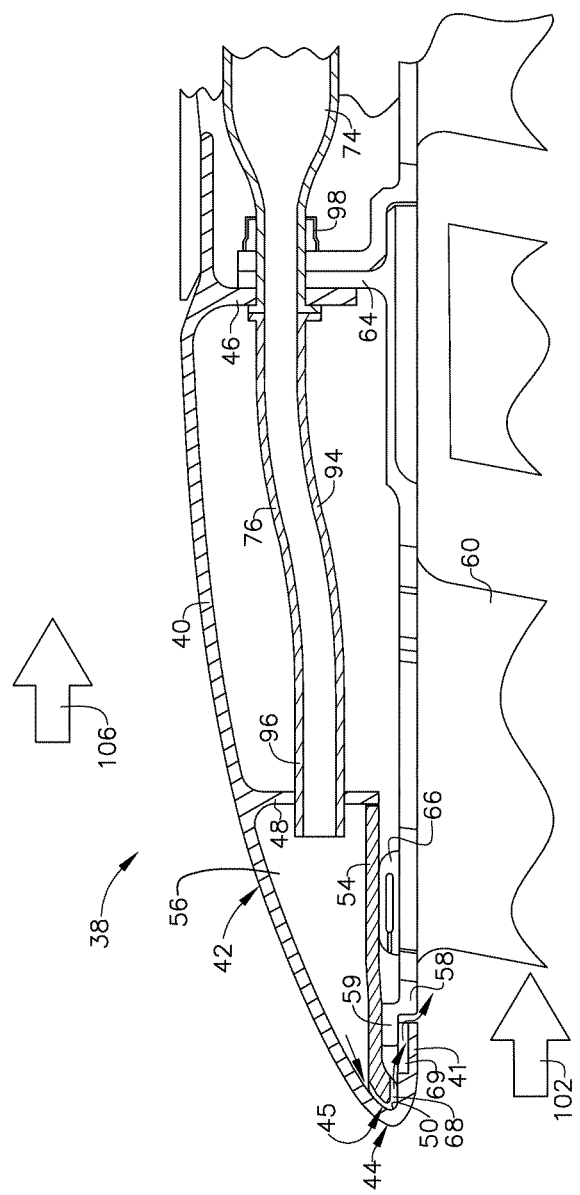
FIG. 2 is a detailed cross-sectional view of an example heated booster splitter.
Figure 3:
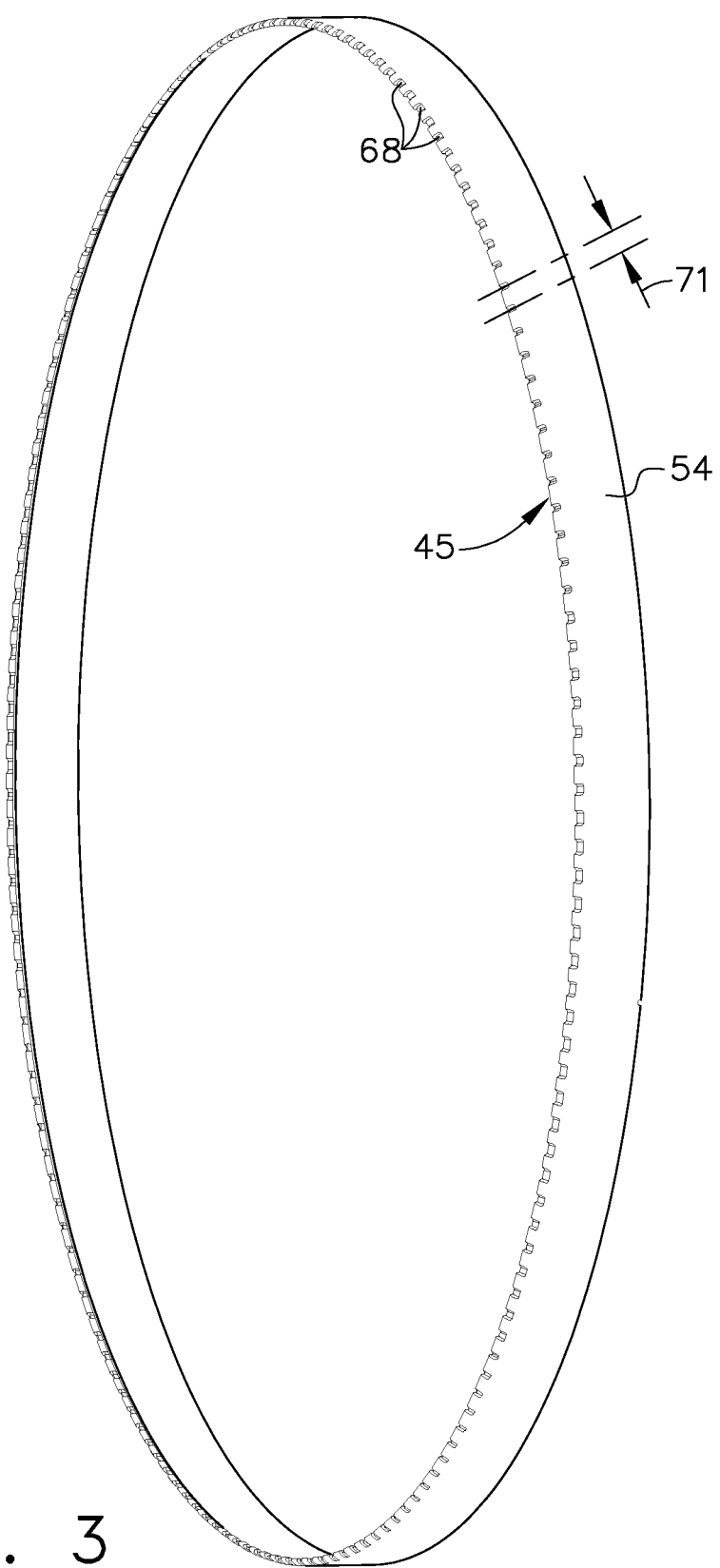
FIG. 3 is a perspective view of an example splitter support.
Figure 4:
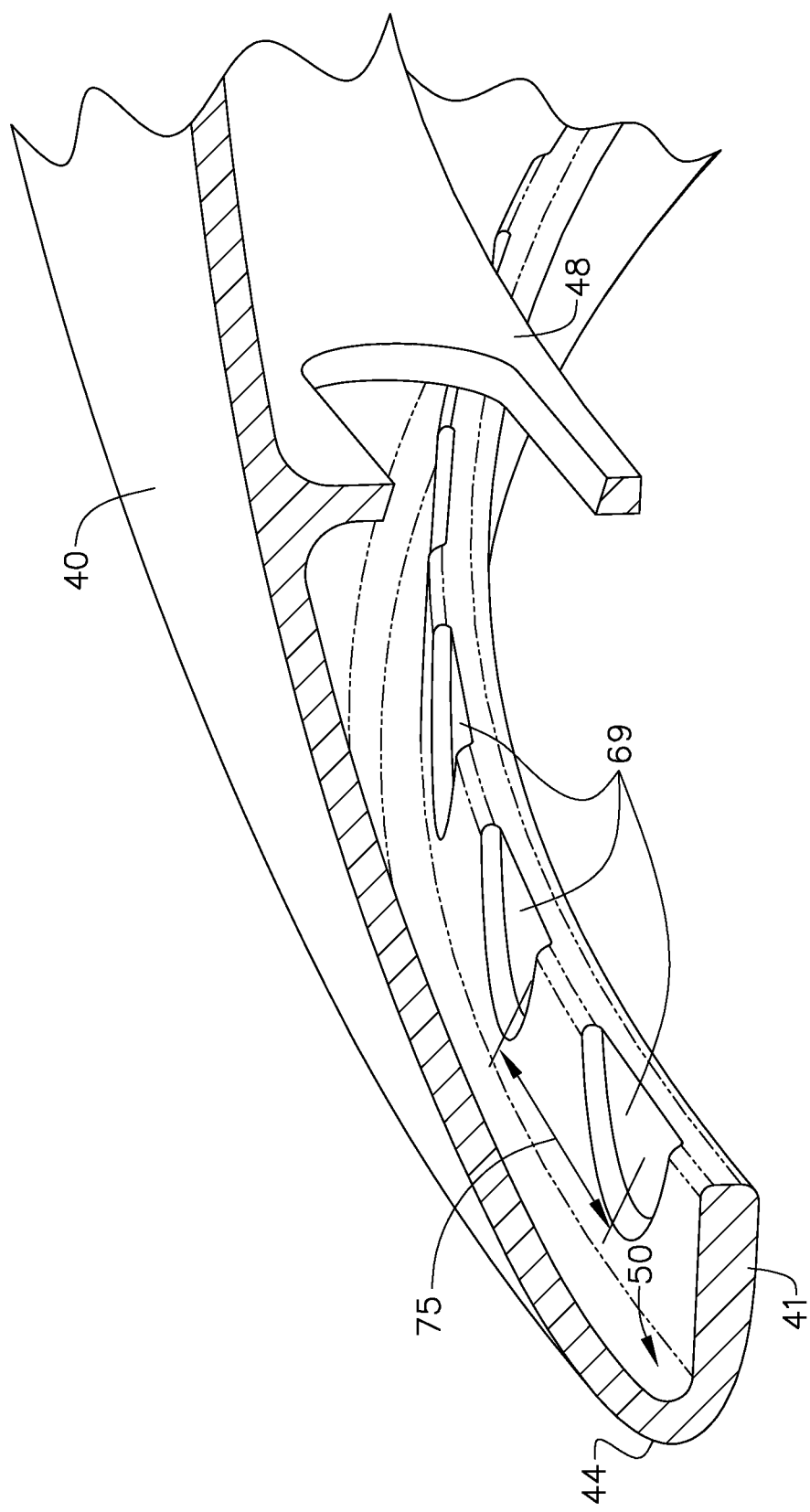
FIG. 4 is a detailed partial cutaway perspective view of an example splitter outer wall.

FIG. 2 is a detailed cross-sectional view of an example heated booster splitter 38, according to at least some aspects of the present disclosure. FIG. 3 is a perspective view of an example splitter support 54, according to at least some aspects of the present disclosure. FIG. 4 is a detailed partial cutaway perspective view of an example splitter outer wall 40, according to at least some aspects of the present disclosure.

An example splitter 38 may include a generally annular outer wall 40 with a convex-curved, tapered shape that defines a flowpath surface 42. The flowpath surface 42 may include a radially-outward-facing portion and a radially-inward-facing portion; the two portions may be demarcated by an aerodynamic convex-curved leading edge 44 at the forward end of the splitter 38. A generally radially-aligned, generally annular aft bulkhead 46 may be disposed generally near the aft end of the splitter 38. A generally radially-aligned, generally annular forward bulkhead 48 may be disposed between the aft bulkhead 46 and the leading edge 44. The outer wall 40 and bulkheads 46 and 48 may be constructed as one integral component.

The splitter 38 and components surrounding and positioned adjacent to the splitter 38 may be made from materials such as metal alloys (for example, titanium alloys) or composite materials (for example, carbon-fiber epoxy composites).

A generally annular, generally axially-aligned, aft-facing groove may be defined by a splitter inner surface 50 of the outer wall 40 just aft of the leading edge 44. A generally annular splitter support (also referred to as a floorplate) 54 may extend generally axially between the splitter inner surface 50 and the forward bulkhead 48. More specifically, a forward edge 45 of the splitter support 54 may be received in the groove 50 and the aft end of the splitter support 54 may be coupled to forward bulkhead 48, such as near its radially inward end. In some example embodiments, the aft end of the splitter support 54 may be welded to the forward bulkhead 48, and alternative embodiments may use fasteners, brazing, or adhesives. In some example embodiments, the forward edge 45 of the splitter support 54 may be held substantially in contact with splitter inner surface 50 due to the attachment of the aft end of the splitter support 54 to the forward bulkhead and/or the forward end of the splitter support 54 may not be otherwise joined (e.g., by welding, brazing, fasteners, or adhesives) to the groove 50. Some example embodiments may be constructed welding the aft end of the splitter support 54 to the forward bulkhead 48 while preloading the splitter support 54 in a generally forward direction into contact with the aft facing splitter inner surface 50.

In some example embodiments, by having the forward edge 45 of the splitter support 54 held substantially in contact with the splitter inner surface 50, relatively little variation in flow area through metering slots 68 may be observed across a range of operating conditions. Accordingly, some example splitters according to the present disclosure may be designed to use less bleed air than other configurations, which may be subject to thermal variation during operating conditions. For example, the flow areas in some other configurations may vary due to thermal expansion generally near the feed pipes 74, which may necessitate higher design flow rates to provide desired heat transfer to the splitter.

Collectively, the forward portion of the outer wall 40, the forward bulkhead 48, and the splitter support 54 may substantially define a generally annular splitter plenum 56. In some example embodiments, the splitter plenum 56 may include one cavity extending substantially entirely around the annular splitter 38. In some example embodiments, the splitter plenum 56 may comprise a plurality of cavities separated by one or more generally radially oriented walls.

An example splitter 38 may be mounted to an annular outer band 58 which circumscribes a row (e.g., a radial array) of airfoil-shaped booster inlet guide vanes 60. For example, outer band 58 may include a generally annular forward rail 59, which may be disposed between a radially inner surface of the splitter support 54 and an aft-extending, radially inner portion 41 of the outer wall 40. The aft bulkhead 46 may bear against and/or may be secured to a radially-extending annular flange 64 of the outer band 58 or adjacent stationary structure, for example using bolts or other mechanical fasteners.

A resilient annular seal 66 may be disposed between the outer band 58 and the splitter support 54 and may serve to mitigate airflow leakage between the splitter support 54 and the outer band 58. In some example embodiments, the seal 66 may have a hollow cross-section.

In some example embodiments, the forward edge 45 of the splitter support 54 may include an array of circumferentially spaced-apart metering slots 68, which may permit airflow against the inner surface of the outer wall 40 leading edge 44. For example, metering slots 68 may form generally "U" shaped paths from the splitter plenum 56 into fluidic communication with the forward end of forward rail 59 of the outer band 58. In some example embodiments, metering slots 68 may be spaced apart circumferentially by a spacing 71, which may be substantially constant or which may vary around the circumference of the splitter support 54.

Some example embodiments may include metering slots 68 of different widths. For example, some example embodiments may include generally narrower metering slots 68 near the feed pipes 74 and generally wider metering slots 68 farther away from the feed pipes 74 (e.g., about 45 degrees away). Some example embodiments may include generally intermediate width metering slots 68 circumferentially between the narrower metering slots 68 and the wider metering slots 68. In some example embodiments, the generally wider metering slots 68 may be about two times the width of the generally narrower metering slots 68. In some example embodiments, generally narrower metering slots 68 may be disposed circumferentially nearer individual feed pipes 74 than generally wider metering slots 68, which may promote more even flow distribution through the metering slots 68.

In some example embodiments, the aft-extending, radially inner portion 41 of the outer wall 40 may include an array of circumferentially spaced-apart exit slots 69 generally facing splitter support 54. Generally, an exit slot 69 may be positioned to receive airflow from one or more metering slots 68. Exit slots 69 may be arranged to
direct airflow from metering slots 68 into the core airflow 102, such as at an aerodynamically desirable angle and/or location. In some example embodiments, the exit slots 69 may be positioned circumferentially between the inlet guide vanes 60. Exit slots 69 may be spaced apart by a spacing 75, which may vary around the circumference of the outer wall 40.

Some example embodiments may include about twice as many metering slots 68 as exit slots 69. In some such embodiments, two metering slots 68 may be associated with an individual exit slot 69. For example, some embodiments may include about 168 metering slots 68 and/or about 84 exit slots 69.

Some example embodiments may include about three times as many metering slots 68 as exit slots 69. In some such embodiments, three metering slots 68 may be associated with an individual exit slot 69.

Some example embodiments may include about four times as many metering slots 68 as exit slots 69. In some such embodiments, four metering slots 68 may be associated with an individual exit slot 69. [0001] Some example embodiments may include circumferential portions in which the number of metering slots 68 associated with an individual exit slot 69 varies circumferentially. For example, a first circumferential portion may include two metering slots 68 associated with an individual exit slot 69 and a second circumferential portion may include three metering slots 68 associated with an individual exit slot 69.

Figure 5:
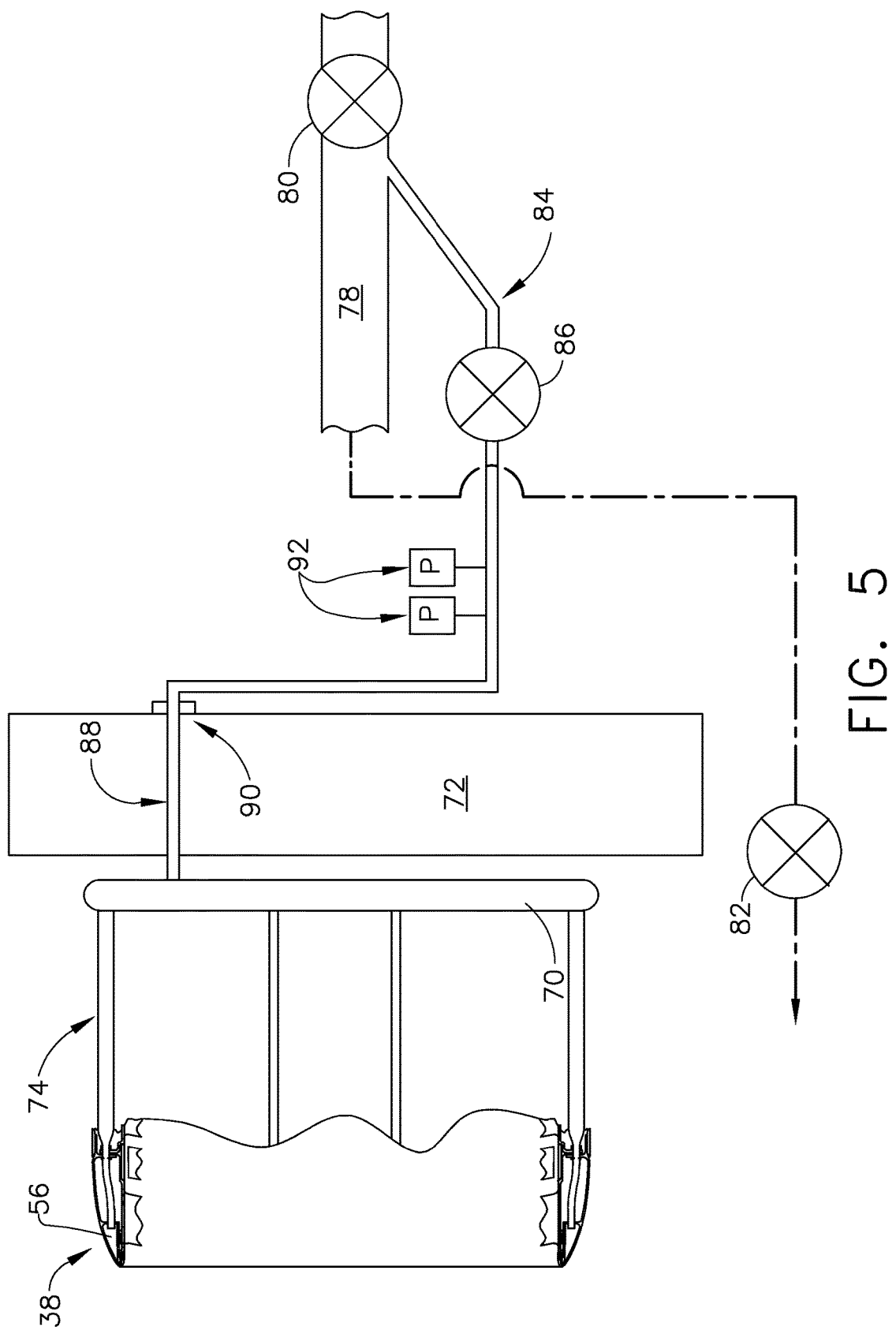
FIG. 5 is a schematic diagram of an example anti-ice splitter heated air system, all in accordance with at least some aspects of the present disclosure.

FIG. 5 is a schematic diagram of an example anti-ice splitter heated air system, in accordance with at least some aspects of the present disclosure. The engine 16 may include an engine anti-icing duct 78, which may take generally high-temperature, pressured bleed air from the high pressure compressor 30 (e.g., from the seventh compressor stage), under the control of a pressure regulating shut-off valve 80. Optionally, the air may be ducted through a pressure regulating valve 82 to the engine's inlet and/or other structures. A takeoff duct 84 may branch from the anti-icing duct 78 to an active valve 86, which may control flow through a splitter feed duct 88. The splitter feed duct 88 may pass through the fan hub frame 72 (e.g., through a boss 90) and/or may feed the generally warmer air to the manifold 70 and feed pipes 74. Some example embodiments may include four feed pipes 74, which may be circumferentially spaced apart substantially evenly.

The active valve 86 may be controlled according to an appropriate control scheme, which may provide heated air flow under certain conditions. For example, some embodiments may use electropneumatic control, hydraulic (e.g., using pressurized fuel) control, and/or electronic control in connection with active valve 86.

In some example embodiments, optional redundant pressure transducers 92 may be provided in the splitter feed duct 88, such as downstream of the active valve 86, and/or may be used to verify operation of the active valve 86. For example, if the active valve 86 is commanded "open," but no pressure increase is sensed by the transducers 92, this may be an indication that the active valve 86 has failed to actually open.

Some example embodiments may include a jumper tube assembly 76 (seen in FIG. 2) extending forward from each feed pipe 74. An individual assembly 76 may include a jumper tube 94. The forward end 96 of the jumper tube 94 may extend through the forward bulkhead 48 into splitter plenum 56. The aft end 98 of the jumper tube may extend through the aft bulkhead 46 and couple to the feed pipe 74. The feed pipes 74 and jumper tube assemblies 76 may be arranged to provide generally circumferentially-consistent air flow to the splitter plenum 56.

The diameter, length, material, surface finishes and other characteristics of the ducting including the takeoff duct 84, splitter feed duct 88, manifold 70, feed pipes 74, and jumper tube assemblies 76 may be selected according to known engineering principles to provide appropriate pressure, velocity, and/or flow rate to feed the splitter plenum 56 as needed for anti-icing operation.

In operation, the engine 16 may be exposed to icing conditions, for example the presence of moisture in temperatures near the freezing point of water. Ice may naturally tend to form on the leading edge structures including the splitter 38. As the ice mass builds up, it may protrude into the air flow and increasing aerodynamic (drag) forces act on it, which may eventually cause portions of the ice to shed from the splitter 38. In some circumstances, mechanical vibrations (e.g., as an engine is being spooled up) may trigger the ice shedding.

When necessary to avoid ice buildup or to cause shedding of accreted ice, the valves 80 and 86 may be opened, permitting high-temperature pressurized air to enter the splitter feed duct 88 and manifold 70. For example, an anti-ice system may be configured to automatically begin operation upon detection of potential icing conditions, such as upon detection of liquid water, low temperature, and/or low fan speed. Some example embodiments may be configured to begin operation based upon data received from an ice sensor. The valve 86 may be used to reduce the pressure as desired. The heated air may be fed into the splitter plenum 56 through the jumper tube assemblies 76. The air may flow substantially freely circumferentially within the splitter plenum 56, heating the outer wall 40, with the heating effect concentrated near the leading edge 44, where ice shedding may be of particular interest. This may have the effect of reducing or preventing ice buildup and/or causing shedding of already attached ice. The splitter plenum 56 may be heated in such a way that accumulation of ice is prevented and/or accumulated ice may shed as relatively small particles which have a reduced tendency to affect engine operation.

The spent heating air may exit the splitter plenum 56 through the metering slots 68 and exit slots 69, which may direct the air in such a way as to minimize aerodynamic losses, such as by ejecting it generally parallel to the streamlines flowing past the inlet guide vanes 60. In this way the cycle penalty for using bleed air to heat the splitter 38 may be mitigated.

Some example embodiments according to at least some aspects of the present disclosure may include outer walls that are thinner and/or may include smaller air supply piping than some other designs (see, for example, U.S. Patent Application Publication No. 2012/0192544). Generally, some example embodiments may provide desired structural performance (e.g., in view of ingestion events) and/or desired heat transfer (e.g., to reduce icing), while having a lower weight and/or consuming less bleed air as compared to some other designs.

Although the present disclosure includes descriptions of example embodiments in the context of a turbofan engine, it will be understood that the principles contained may apply to other types of engines, such as turbojet or turboshaft engines, as well as to other leading edge structures that may be susceptible to icing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A splitter apparatus for a gas turbine engine, comprising:
    a splitter including a generally annular outer wall substantially defining a convex leading edge at a forward end of the outer wall;
    a generally annular splitter support positioned radially within the outer wall, the splitter support comprising a forward end disposed substantially against a splitter inner surface of the outer wall; and
    a generally annular first bulkhead spanning between the outer wall and the splitter support, wherein the outer wall, the splitter support, and the first bulkhead collectively substantially define a generally annular splitter plenum;
    wherein the forward end of the splitter support comprises a plurality of circumferentially spaced apart, generally radially oriented metering slots therein;
    wherein the outer wall comprises an inner portion disposed generally radially inward from the splitter inner surface and extending generally aft, the inner portion comprising a plurality of spaced-apart exit slots; and
    wherein the splitter plenum, the metering slots, and the exit slots are arranged to conduct airflow from the plenum, through the metering slots substantially against the splitter inner surface, and through the exit slots.

2. The apparatus of claim 1, wherein the forward edge of the splitter support is disposed substantially in contact with, but is not attached to, the splitter inner surface.

3. The apparatus of claim 1, further comprising a generally radially oriented vane disposed radially inward of the splitter, the vane being mounted to an outer band comprising a forwardly extending forward rail positioned radially between the splitter support and the inner portion of the outer wall.

4. The apparatus of claim 3, further comprising a generally annular, resilient seal disposed between the outer band and the splitter support.

5. The apparatus of claim 1, wherein a number of metering slots is about twice a number of exit slots.

6. The apparatus of claim 1, wherein a number of metering slots is about three times a number of exit slots.

7. The apparatus of claim 1, wherein a number of metering slots associated with an individual exit slot varies circumferentially.

8. The apparatus of claim 1, wherein the plurality of metering slots comprises metering slots of a first width and a second width different than the first width.

9. The apparatus of claim 1, wherein a spacing between adjacent ones of the metering slots varies circumferentially around the splitter support.

10. The apparatus of claim 1, wherein a spacing between adjacent ones of the metering slots is substantially constant circumferentially around the splitter support.

11. A gas turbine engine, comprising:
    a rotatable fan;
    a rotatable booster disposed aft of the fan;
    a turbomachinery core disposed aft of the booster and operable to generate a flow of pressurized combustion gases;
    a generally annular core nacelle disposed radially around the booster and the turbomachinery core;
    a low-pressure turbine disposed aft of the turbomachinery core and mechanically coupled to the booster and the fan;
    a radial array of airfoils disposed forward of the booster and substantially circumscribed by a generally annular outer band;
    a splitter disposed at a forward end of the core nacelle and surrounding the outer band, the splitter including:
        a generally annular outer wall substantially defining a convex-curved leading edge at a forward end of the outer wall;
        a generally annular splitter support positioned radially within the outer wall, the splitter support comprising a forward end disposed in contact with a splitter inner surface of the outer wall; and
        a generally annular first bulkhead spanning between the outer wall and the splitter support, wherein the outer wall, the splitter support, and the first bulkhead substantially define a generally annular splitter plenum;

wherein the forward end of the splitter support comprises a plurality of circumferentially spaced apart, generally radially oriented metering slots therein;

wherein the outer wall comprises an inner portion disposed generally radially inward from the splitter inner surface and extending generally aft, the inner portion comprising a plurality of spaced-apart exit slots; and wherein the splitter plenum, the metering slots, and the exit slots are arranged to conduct airflow from the plenum, through the metering slots substantially against the splitter inner surface, and through the exit slots.

12. The gas turbine engine of claim 11, wherein the outer band comprises a forwardly extending forward rail disposed radially between the splitter support and the inner portion of the outer wall.

13. The gas turbine engine of claim 12, further comprising a seal disposed between the outer band and the splitter support, the seal substantially preventing airflow between the outer band and the splitter support.

14. The gas turbine engine of claim 11,
wherein the outer wall comprises a radially inwardly extending, generally annular aft bulkhead;
wherein the outer band comprises a radially outwardly extending, generally annular flange; and
wherein the flange of the outer band is coupled to the aft bulkhead.

15. The gas turbine engine of claim 11, wherein individual ones of the plurality of exit slots are generally semi-circular.

16. The gas turbine engine of claim 11, wherein a spacing between adjacent ones of the exit slots varies circumferentially around the outer wall.

17. The gas turbine engine of claim 11, wherein an individual one of the exit slots are arranged to receive airflow from two or more of the metering slots.

18. The gas turbine engine of claim 11, wherein an individual one of the exit slots is arranged to receive airflow from three or more of the metering slots.

19. The gas turbine engine of claim 11, wherein the plurality of metering slots comprises metering slots of a first width and a second width different than the first width.

20. The gas turbine engine of claim 11, wherein a spacing between adjacent ones of the metering slots varies circumferentially around the splitter support.

* * * * *